(12) United States Patent
Liu

(10) Patent No.: US 12,415,138 B2
(45) Date of Patent: Sep. 16, 2025

(54) INFORMATION PROCESSING METHOD, APPARATUS AND SYSTEM, AND SERVER AND STORAGE MEDIUM

(71) Applicant: NETEASE (HANGZHOU) NETWORK CO., LTD., Zhejiang (CN)

(72) Inventor: Rui Liu, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 337 days.

(21) Appl. No.: 18/016,191

(22) PCT Filed: Mar. 18, 2022

(86) PCT No.: PCT/CN2022/081787
§ 371 (c)(1),
(2) Date: Jan. 13, 2023

(87) PCT Pub. No.: WO2022/252756
PCT Pub. Date: Dec. 8, 2022

(65) Prior Publication Data
US 2023/0211238 A1    Jul. 6, 2023

(30) Foreign Application Priority Data
Jun. 4, 2021   (CN) .......................... 202110628630.3

(51) Int. Cl.
  *A63F 13/822*   (2014.01)
  *A63F 13/35*    (2014.01)
  *A63F 13/52*    (2014.01)
(52) U.S. Cl.
  CPC ............ *A63F 13/822* (2014.09); *A63F 13/35* (2014.09); *A63F 13/52* (2014.09); *A63F 2300/807* (2013.01)

(58) Field of Classification Search
  None
  See application file for complete search history.

(56) References Cited

FOREIGN PATENT DOCUMENTS

| CN | 206896790 U | 1/2018 |
| CN | 110314373 A | 10/2019 |

(Continued)

OTHER PUBLICATIONS

"East Front II The Russian Front". From Wikipedia, The Free Encylopedia. [online], [retrieved on Feb. 8, 2025]. Dated Nov. 17, 2020. Retrieved from the Internet <URL:https://en.wikipedia.org/w/index.php?title=East_Front_II :_The_Russian_Front&oldid=989216214>. 2 pages.*

(Continued)

*Primary Examiner* — Lawrence S Galka
(74) *Attorney, Agent, or Firm* — BCF LLP

(57) ABSTRACT

Provided are an information processing method, apparatus and system, a server and a storage medium, which relates to the field of game technologies; during simulation of an injury and death process of soldiers of an army in a battlefield, an actual damage value of a current attack is first determined; then, an expected death quantity of soldiers of an attacked army is determined according to the actual damage value, and the expected death quantity is sent to a client, such that the client plays a death action corresponding to the expected death quantity. Influences of a soldier species and a surviving soldier quantity are considered when the actual damage value is determined, and influences of the soldier species are also considered when the expected death quantity is determined based on the actual damage value.

17 Claims, 2 Drawing Sheets

(56) References Cited

FOREIGN PATENT DOCUMENTS

| | | |
|---|---|---|
| CN | 111420403 A | 7/2020 |
| CN | 112668175 A | 4/2021 |
| CN | 113274725 A | 8/2021 |
| WO | 2014178953 A2 | 11/2014 |

OTHER PUBLICATIONS

"East Front II manual", [dated 1999]. [online], [retrieved Feb. 8, 2025]. Retrieved from the Internet <URL:http://www.replacementdocs.com/download.php?view.8440>. 18 pages.*

International Search Report (and English Translation) and Written Opinion with regard to the PCT/CN2022/081787 mailed Jun. 15, 2022.

English Abstract for CN113274725 retrieved on Espacenet on Jan. 13, 2023.

English Abstract for CN110314373 retrieved on Espacenet on Jan. 13, 2023.

English Abstract for CN206896790 retrieved on Espacenet on Jan. 13, 2023.

English Abstract for CN112668175 retrieved on Espacenet on Jan. 13, 2023.

Office Action with regard to the CN Patent Application No. 202110628630.3 issued Oct. 27, 2023.

* cited by examiner

INFORMATION PROCESSING METHOD, APPARATUS AND SYSTEM, AND SERVER AND STORAGE MEDIUM

CROSS-REFERENCE TO RELATED APPLICATIONS

The present disclosure is a National Stage of International Application No. PCT/CN2022/081787 filed on Mar. 18, 2022, which claims priority of Chinese Patent Application No. 202110628630.3, entitled "Information Processing Method, Apparatus And System, And Server And Storage Medium", filed with China National Intellectual Property Administration on Jun. 4, 2021, the entire content of which is incorporated herein by reference.

TECHNICAL FIELD

The present disclosure relates to the field of game technologies, and particularly to an information processing method, apparatus and system, a server and a storage medium.

BACKGROUND ART

A war game has a basic combat goal of providing real and epic combat scenarios and experiences for a player; for example, in case of combat with thousands of people on a same screen, due to limitations on a performance of a mobile phone and control of the player, a server cannot calculate health points of all champions/soldiers in real time, and the player cannot control hundreds of champions/soldiers on the mobile phone in real time. Therefore, each champion/soldier in the combat cannot be taken as an independent unit in the mobile game, and thus, an army usually serves as a minimum combat unit, and the player only controls several armies simultaneously. The army consists of 1 champion and a plurality of soldiers, and a number of the soldiers ranges from 1 (large soldier unit) to 120 (common soldiers) according to soldier species; the minimum combat unit refers to a minimum unit controllable by the player in the war game.

SUMMARY

Some embodiments of the present disclosure provide an information processing method, which may include steps of:
acquiring current combat information of an attacking army and current combat information of an attacked army in a current attack, wherein the current combat information of the attacking army may include soldier species, a surviving soldier quantity and army attack power of the attacking army, and the current combat information of the attacked army may include soldier species, a surviving soldier quantity and a current army health point of the attacked army;
determining an actual damage value of the current attack according to the current combat information of the attacking army and the current combat information of the attacked army;
determining an expected death quantity of soldiers of the attacked army according to the actual damage value and the soldier species and the current army health point of the attacked army; and
sending the expected death quantity to a client, such that the client plays a death action corresponding to the expected death quantity.

Some other embodiments of the present disclosure further provide a server, which may include a memory and a processor, wherein the memory may store therein a computer program operable on the processor, and the processor may execute the computer program to implement the information processing method according to the above-mentioned embodiments.

Other embodiments of the present disclosure further provide a computer-readable storage medium, which may have a computer program stored thereon, wherein the computer program, when executed by a processor, may perform the information processing method according to the above-mentioned embodiments.

BRIEF DESCRIPTION OF DRAWINGS

To describe the technical solutions in the specific embodiments of the present disclosure or the related art more clearly, the following briefly describes the accompanying drawings required for describing the specific embodiments or the related art. Apparently, the accompanying drawings in the following description show some embodiments of the present disclosure, and a person of ordinary skill in the art may still derive other drawings from these accompanying drawings without creative efforts.

DETAILED DESCRIPTION

Figure 1:
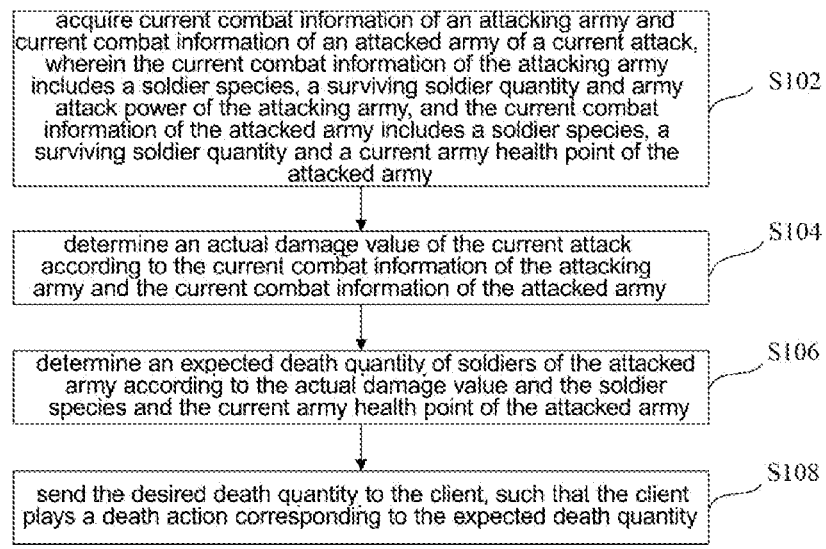
FIG. 1 is a schematic flow chart of an information processing method according to an embodiment of the present disclosure.

The technical solutions of the present disclosure will be clearly and completely described below in conjunction with the embodiments, and apparently, the described embodiments are not all but a part of the embodiments of the present disclosure. All other embodiments obtained by a person of ordinary skill in the art based on the embodiments of the present disclosure without creative efforts shall fall within the protection scope of the present disclosure.

In a war game with an army as a minimum combat unit, a server cannot precisely calculate a health point of each soldier in the army, and in this case, if no processing is performed, the army in combat may have a large number of conditions influencing combat quality; for example, a health point of the army is greatly reduced, but actual attack power of the army is still the same as that of the army with a full-strength army health point (full health point for short), and a surviving soldier quantity of the army is completely inconsistent with cognition of real combat by a player. Moreover, different soldier species have completely different attack characteristics; for example, a quantity of soldiers (i.e., a quantity of beasts) in a beast army is small, but compared with common soldiers, the beasts may attack more soldiers each time; each shot by a tank army also causes splash damage to a plurality of surrounding soldiers, and therefore, the combat quality is greatly reduced if the attacking characteristics of the soldier species are not considered.

During simulation of an injury and death process of the soldiers of the army in a battlefield, 2 schemes are usually adopted currently, one scheme is of a simple and crude type: the soldiers in the combat only exist as pure expression for heightening a combat atmosphere, and regardless of the remaining health point of the army, the attack, the number of the soldiers and the damage taken by the soldiers are not changed, and all the soldiers die and disappear directly when the health point of the army is completely lost. The other scheme is of a simply optimized type: attack power of the army is linearly or quadratically reduced with the health point, and death actions of the soldiers are randomly played in a health point losing process of the army.

The simple and crude scheme has obvious defects, and although a combat scene is bustling, the whole combat process is quite fake, all the soldiers of the whole army disappear/play a death action together when the army dies. The player feels that only a few units are in combat, and an epic combat scene cannot be restored really.

In the simply optimized scheme, the attack power and a death rule are simply corrected, an intuitive feeling that the attack power is really reduced with the reduction of the health point of an attacking army and the number of the soldiers in an attacked army is also really reduced one by one is brought to the player from a qualitative perspective, but the linear or quadratic reduction of the attack power and the random of the death number are far away from an actual war scenario, and an actual combat scene cannot be reflected.

Based on this, embodiments of the present disclosure provide an information processing method, apparatus and system, a server and a storage medium, which may enhance battlefield expression by simulating injury and death laws of a real battlefield, thereby improving combat experiences of the player.

To facilitate understanding of the present embodiments, an information processing method according to an embodiment of the present disclosure is first described in detail.

The embodiment of the present disclosure provides an information processing method which may be executed by a server of a war game with an army as a minimum combat unit. In the war game, the whole army has a same total health point, and when the army is taken damage, the server reduces the health point of the army according to an established rule, and a client performs death expression according to an expected death quantity issued by the server; when the health point of the army is reduced to 0, the army dies. The method mainly solves, by involving attack differences brought by the surviving soldier quantity and the soldier species of the army, the following two problems: 1, a descending curve of a damage value caused by an attacking army in combat with a decrease of the army health point does not conform to the reality; 2, a death law of soldiers of an attacked army in the combat does not conform to the reality.

Reference is made to FIG. 1, which shows a schematic flow chart of an information processing method, which mainly includes the following steps S102 to S108:

step S102: current combat information of an attacking army and current combat information of an attacked army in a current attack are acquired, wherein the current combat information of the attacking army includes a soldier species, a surviving soldier quantity and army attack power of the attacking army, and the current combat information of the attacked army includes a soldier species, a surviving soldier quantity and a current army health point of the attacked army.

The server obtains several data of the attacking army and the attacked army in real time, and the data mainly includes the soldier species, the surviving soldier quantity and the displayed army attack power of the attacking army, as well as the soldier species, the surviving soldier quantity and the army current health point of the attacked army, and in addition, a full-strength soldier quantity of the attacking army, current defense power, a full-strength army health point and a full-strength soldier quantity of the attacked army, or the like, may also be obtained. In the above, army attack power is total attack power when the army has full strength, and a full strength state refers to a state when the surviving soldier quantity of the army is the largest.

Step S104: an actual damage value of the current attack is determined according to the current combat information of the attacking army and the current combat information of the attacked army.

In the embodiment of the present disclosure, besides conventional attributes, such as attack, defense, or the like, two parameters of the surviving soldier quantity of the army and a maximum army damage quantity obtained according to the soldier species of the army are added during calculation of the actual damage value, and the two parameters are merged into a combat model to calculate the actual damage value of each attack. In the above, the maximum army damage quantity of the attacking army refers to a maximum quantity of soldiers that the attacking army can damage simultaneously. The maximum army damage quantity is proposed by considering that in real war, a situation that all soldiers in the attacked army are simultaneously damaged usually does not exist, and the surviving soldier quantity and the soldier species in the attacking army influence the maximum quantity of the soldiers that the attacking army can damage simultaneously.

Based on this, in some possible embodiments, step S104 may be implemented by the following substeps 1 to 4:

Substep 1: actual effective attack power of the attacking army is determined according to the soldier species, the surviving soldier quantity and the army attack power of the attacking army.

Considering that only a few soldiers in a melee army may attack the enemy army and be attacked by the enemy army simultaneously due to a position problem in actual combat, the parameter of a "maximum effective attack quantity" is added in the present embodiment, i.e., an actual maximum quantity of soldiers that can directly attack the enemy army simultaneously in the melee army, which is equal to a maximum quantity of soldiers that can be attacked simultaneously in the melee army.

Based on this, in some possible embodiments, when an attack type corresponding to the soldier species of the attacking army is a melee attack (that is, the attacking army is a melee army), the maximum effective attack quantity corresponding to the soldier species of the attacking army is acquired, and the actual effective attack power of the attacking army is calculated using the following formula:

$$A_1 = A_0 * \min(N_{11}, Q_{11})/N_{10}; \text{ and}$$

when the attack type corresponding to the soldier species of the attacking army is a ranged attack (that is, the attacking army is a ranged army), the actual effective attack power of the attacking army is calculated using the following formula:

$$A_1 = A_0 * N_{11}/N_{10},$$

wherein $A_1$ represents the actual effective attack power of the attacking army, $A_0$ represents the army attack power of the attacking army, $N_{11}$ represents the surviving soldier quantity of the attacking army, $Q_{11}$ represents the maximum effective attack quantity of the attacking army, and $N_{10}$ represents a full-strength soldier quantity of the attacking army, wherein the full-strength soldier quantity means the maximum quantity of soldiers in the army.

For example, the soldier species of an infantry army is infantry, the attack type corresponding to the infantry is a melee attack, and therefore, the infantry army is a melee army, and the maximum effective attack quantity corresponding to the infantry may be set to 20; when the full-strength soldier quantity of the infantry army is set to 100, if the current surviving soldier quantity of the infantry army is greater than 20, at most 20 soldiers can attack simultaneously due to the position, the rest soldiers cannot attack, and if the current surviving soldier quantity of the infantry army is less than or equal to 20, all the soldiers in the infantry army can attack simultaneously. For another example, the soldier species of the beast army is beasts, the attack type corresponding to the beast is a melee attack, and therefore, the beast army is also a melee army, the maximum effective attack quantity corresponding to the beast may be set to 3, and when the full-strength soldier quantity of the beast army is set to 3, all the soldiers in the beast army can attack simultaneously. For another example, the soldier species of an artillery army is artillerymen, the attack type corresponding to the artillerymen is a ranged attack, and therefore, the artillery army is a ranged army.

Substep 2: a maximum army damage quantity of the attacking army is determined according to the soldier species and the surviving soldier quantity of the attacking army, and a maximum army damage quantity of the attacked army is determined according to the soldier species and the surviving soldier quantity of the attacked army.

A maximum single-soldier damage quantity and the surviving soldier quantity both influence the maximum army damage quantity, wherein the maximum single-soldier damage quantities are in one-to-one correspondence to the soldier species, and similarly, the maximum effective attack quantity is also required to be considered for the maximum army damage quantity of the melee army.

Based on this, in some possible embodiments, when the attack type corresponding to the soldier species of the attacking army is a melee attack, the maximum effective attack quantity corresponding to the soldier species of the attacking army is acquired, and the maximum army damage quantity of the attacking army is calculated using the following formula:

$$Q_{12}=Q_{10}*\min(N_{11}, Q_{11}), \text{ and}$$

when the attack type corresponding to the soldier species of the attacking army is a ranged attack, the maximum army damage quantity of the attacking army is calculated using the following formula:

$$Q_{12}=Q_{10}*N_{11};$$

wherein $Q_{12}$ represents the maximum army damage quantity of the attacking army, $Q_{10}$ represents the maximum single-soldier damage quantity corresponding to the soldier species of the attacking army, $N_{11}$ represents the surviving soldier quantity of the attacking army, and $Q_{11}$ represents the maximum effective attack quantity of the attacking army.

Similarly, when an attack type corresponding to the soldier species of the attacked army is a melee attack, a maximum effective attack quantity corresponding to the soldier species of the attacked army is acquired, and the maximum army damage quantity of the attacked army is calculated using the following formula:

$$Q_{22}=Q_{20}*\min(N_{21}, Q_{21}); \text{ and}$$

when the attack type corresponding to the soldier species of the attacked army is a ranged attack, the maximum army damage quantity of the attacked army is calculated using the following formula:

$$Q_{22}=Q_{20}*N_{21},$$

wherein $Q_{22}$ represents the maximum army damage quantity of the attacked army, $Q_{20}$ represents a maximum single-soldier damage quantity corresponding to the soldier species of the attacked army, $N_{21}$ represents the surviving soldier quantity of the attacked army, and $Q_{21}$ represents the maximum effective attack quantity of the attacked army.

In order to facilitate understanding, in a possible implementation, armies may be classified into 4 categories according to the soldier species and requirements of game playing methods, and different army categories and corresponding maximum single-soldier damage quantities thereof are shown in table 1 below:

TABLE 1

| Army category | Maximum single-soldier damage quantity |
|---|---|
| Infantry | 1 |
| Cavalry | 1 |
| Beast | 5 |
| Mechanization | 10 |

Substep 3: an actual attacked quantity of the attacked army is determined according to the maximum army damage quantity of the attacking army, and the surviving soldier quantity and the maximum army damage quantity of the attacked army.

The attacked army is classified into a melee army or a ranged army. When the attacked army is a melee army, the attacked army will be attacked by the attacking army in a melee mode, such that when the actual attacked quantity of the attacked army is determined, the maximum army damage quantity of the attacking army, and the surviving soldier quantity and the maximum army damage quantity of the attacked army are required to be considered simultaneously; that is, the actual attacked quantity of the attacked army is a minimum value among the maximum army damage quantity of the attacking army, and the surviving soldier quantity and the maximum army damage quantity of the attacked army.

When the attacked army is a ranged army and is ranged attacked by the attacking army, as the actual attacked quantity of the attacked army is determined, only the maximum army damage quantity of the attacking army and the surviving soldier quantity of the attacked army may be considered; that is, the actual attacked quantity of the attacked army is the smaller one of the maximum army damage quantity of the attacking army and the surviving soldier quantity of the attacked army.

Considering that once being attacked in melee, the ranged army may hardly continue to use a ranged attack, but only fight hand to hand, that is, the ranged army becomes a melee army, so that when the attacked army is a ranged army and is attacked by the attacking army in melee, the actual attacked quantity of the attacked army is the minimum value among the maximum army damage quantity of the attacking army, and the surviving soldier quantity and the maximum army damage quantity of the attacked army.

In addition, considering that when the attacked army is a ranged army and is attacked in ranged by the attacking army, the maximum army damage quantity of the attacked army is greater than or equal to the surviving soldier quantity of the attacked army, so that the minimum value among the maximum army damage quantity of the attacking army, and the surviving soldier quantity and the maximum army damage quantity of the attacked army is equal to the smaller one of the maximum army damage quantity of the attacking army and the surviving soldier quantity of the attacked army. On this basis, no matter whether the attacked army is a melee army or a ranged army, substep 3 may be implemented by: determining the minimum value of the maximum army damage quantity of the attacking army, and the surviving soldier quantity and the maximum army damage quantity of the attacked army as the actual attacked quantity of the attacked army.

Substep 4: the actual damage value of the current attack is determined according to the actual effective attack power of the attacking army, as well as the actual attacked quantity, the surviving soldier quantity and the current army health point of the attacked army.

In some possible embodiments, the actual damage value of the current attack may be determined using the following formula:

$$H=\min(A_1, N_3*B_1/N_{21}),$$

wherein H represents the actual damage value of the current attack, $A_1$ represents the actual effective attack power of the attacking army, $N_3$ represents the actual attacked quantity of the attacked army, $B_1$ represents the current army health point of the attacked army, and $N_{21}$ represents the surviving soldier quantity of the attacked army.

It should be noted that substep 1, substep 2 and substep 3 do not have a sequential execution order, and in other embodiments, substep 1 may be between substep 2 and substep 3, or substep 1 may be after substep 3.

Step S106: an expected death quantity of soldiers of the attacked army is determined according to the actual damage value and the soldier species and the current army health point of the attacked army.

A residual army health point of the attacked army may be first determined according to the actual damage value and the current army health point of the attacked army, and then, the expected death quantity of the soldiers of the attacked army is determined based on the residual army health point and the soldier species.

Optionally, the following rule is set in the present embodiment: health points of all the surviving soldiers in the army are always the same, and under the setting, the server is not required to store the health point of each soldier independently, thus greatly reducing pressure of the server. Based on this, the expected death quantity may have the following calculation rule: when the residual army health point has a relative high value, the soldiers in the army undertake damage averagely, and when the residual army health point is lower than a preset threshold, the soldiers in the army begin to die; a corresponding relationship between the health point and the surviving quantity corresponding to the soldier species is preset in the server, and the expected death quantity corresponding to the residual army health point is determined by searching the corresponding relationship.

Therefore, step S106 may be implemented by the following substeps a and b:

Substep a: the residual army health point of the attacked army is determined according to the actual damage value and the current army health point of the attacked army.

Considering that the defense power of the attacked army may influence an army health point deducting quantity of the attacked army, and thus influence the residual army health point of the attacked army, in some possible embodiments, a damage reduction ratio of the attacked army may be determined according to the current defense power of the attacked army; then, the army residual health point of the attacked army is determined using the following formula:

$$B_2=B_1-H*(1-r),$$

wherein $B_2$ represents the residual army health point of the attacked army, $B_1$ represents the current army health point of the attacked army, H represents the actual damage value, r represents the damage reduction ratio of the attacked army, and $H*(1-r)$ represents the army health point deducting quantity of the attacked army.

Substep b: the expected death quantity of the soldiers of the attacked army is determined according to the residual army health point of the attacked army, the soldier species of the attacked army and the preset corresponding relationship between the health point and the surviving soldiers corresponding to the soldier species.

Optionally, the corresponding relationship between the health point and the surviving soldiers includes a table of corresponding relationships between residual health point percentages and surviving soldier percentages, and based on this, the expected death quantity of the soldiers of the attacked army may be determined through the following process: firstly, a residual health point percentage of the attacked army is calculated according to the residual army health point and the full-strength army health point of the attacked army (residual health point percentage=residual army health point/full-strength army health point); then, a target corresponding relationship table is acquired, wherein the target corresponding relationship table is a table of corresponding relationships between a residual health point percentage and a surviving soldier percentage corresponding to the soldier species of the attacked army; the target corresponding relationship table is searched to obtain a target surviving soldier percentage corresponding to the residual health point percentage of the attacked army; and then the expected death quantity of the soldiers of the attacked army is determined according to the target surviving soldier percentage (expected death quantity of soldiers of attacked army=full-strength soldier quantity−full-strength soldier quantity*target surviving soldier percentage).

Optionally, in some other possible embodiments, considering that the full-strength soldier quantities of armies with the same soldier species may be different, in order to further improve death expression of the armies, different corresponding relationships between the health points and the surviving soldiers may be further set according to different full-strength soldier quantities. Based on this, the above target corresponding relationship table is a table of corresponding relationships between a residual health point percentage and a surviving soldier percentage corresponding to the soldier species and the full-strength soldier quantity of the attacked army.

Step S108: the above expected death quantity is sent to the client, such that the client plays a death action corresponding to the expected death quantity.

The server transmits the expected death quantity to the client, such that the client may select the soldier to play the death action according to the expected death quantity, thereby achieving an effect of simulating real death expression of the soldier in real combat. For example, if the expected death quantity is 5, the client may select 5 soldiers according to a certain rule (a preset selection rule), and play a death action of the 5 soldiers.

In addition, the server may also send the army health point deducting quantity or the residual army health point of the attacked army under the current attack to the client, such that the client may adjust the current army health point of the attacked army according to the army health point deducting quantity or the residual army health point.

In the embodiment of the present disclosure, the server obtains several data of both of the attacking army and the attacked army in real time, including the soldier species, the surviving soldier quantity and the displayed army attack power of the attacking army, as well as the soldier species, the surviving soldier quantity and the army current health point of the attacked army; then, the expected death quantity corresponding to each attack is calculated in real time and issued to the client, such that the client plays the death action based on the expected death quantity according to a certain rule, and therefore, the combat process is more real and conforms to cognition.

Figure 2:
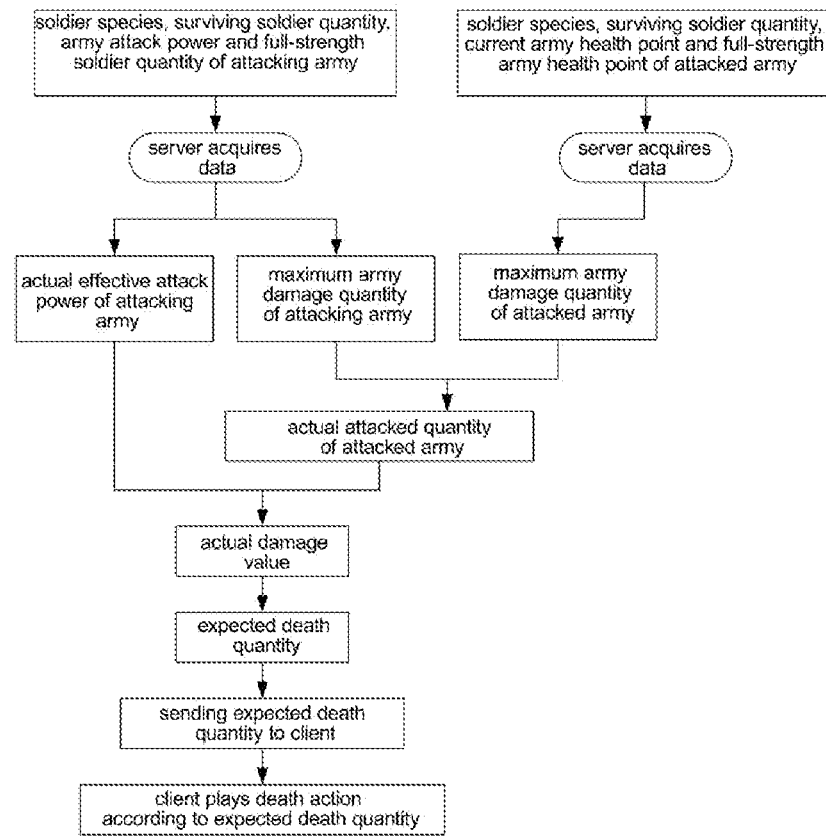
FIG. 2 is a logic flow chart of an information processing method according to an embodiment of the present disclosure.

For ease of understanding, reference is made to FIG. 2 which shows a logic flow chart of an information processing method, and the information processing method is described in detail by way of a specific example.

First step: soldier species, a surviving soldier quantity, army attack power and a full-strength soldier quantity of an attacking army, as well as soldier species, a surviving soldier quantity, a current army health point and a full-strength army health point of the attacked army are acquired by a server. Specific Data is as Follows:

attacking army A: an infantry army, wherein army attack power is 100, full-strength soldier quantity is 100, and all soldiers survive currently (i.e., surviving soldier quantity of army A is 100);

attacking army B: an infantry army, wherein army attack power is 200, full-strength soldier quantity is 100, and current surviving quantity is 15 (i.e., surviving soldier quantity of army B is 15);

attacking army C: a beast army, wherein army attack power is 300, full-strength soldier quantity is 3, and current surviving quantity is 2 (i.e., surviving soldier quantity of army C is 2);

attacked army D: an infantry army, wherein it has no defense power, full-strength army health point is 1,000, current army health point is 330, full-strength soldier quantity is 100, and half the soldiers survive currently (i.e., surviving soldier quantity of army D is 50).

The 4 armies are melee armies. It should be noted that although there are 3 attacking armies, only one attacking army participates in combat at one moment, and expected death quantity of the soldiers of the attacked army caused by each of the attacking armies is calculated in the following.

Second step: a maximum army damage quantity of the attacking army and a maximum army damage quantity of the attacked army are calculated.

$$\text{Maximum army damage quantity} = \min(\text{surviving soldier quantity}, \text{maximum effective attack quantity}) * \text{maximum single-soldier damage quantity}.$$

Assuming that the maximum effective attack quantity corresponding to infantry of the infantry army is 20, the maximum single-soldier damage quantity corresponding to the infantry is 1, the maximum effective attack quantity corresponding to beasts of the beast army is 3, and the maximum single-soldier damage quantity corresponding to the beasts is 5, the calculated maximum army damage quantities of armies A, B, C, D are as follows:

$$A: \min(100,20)*1=20;$$

$$B: \min(15,20)*1=15;$$

$$C: \min(2,3)*5=10,$$

$$D: \min(50,20)*1=20.$$

Third step: actual effective attack power of the attacking army is calculated.

Actual effective attack power=army attack power*min(surviving soldier quantity, maximum effective attack quantity)/full-strength soldier quantity.

Formula interpretation: the army attack power refers to attack power during full strength, the army attack power is divided by the full-strength soldier quantity to obtain attack power of each soldier, which is then multiplied by a current actual available attack quantity to obtain current actual effective attack power of the army, and the current actual available attack quantity should be taken as the smaller one of the surviving soldier quantity and the maximum effective attack quantity.

Based on this, the actual effective attack power of the attacking armies A, B, C is calculated as follows:

$$A: 100*\min(100,20)/100=20;$$

$$B: 200*\min(15,20)/100=30;$$

$$C: 300*\min(2,3)/3=200.$$

Fourth step: an actual attacked quantity of the attacked army is calculated.

Actual attacked quantity of attacked army=min(maximum army damage quantity of attacking army, surviving soldier quantity of attacked army, maximum army damage quantity of attacked army).

Formula interpretation: for a melee army, during its melee combat with another melee army, a quantity of soldiers of the melee army available for attacking the enemy at the same time may be equal to a quantity of soldiers that maybe attacked by the enemy, and therefore, the actual attacked quantity of the attacked army required in the formula is actually calculated for the quantity of soldiers of the attacked army available for attacking at the same time.

According to the formula, the actual attacked quantity of the attacked army is calculated as follows:

when attacked by the army $A$: $\min(20,50,20)=20$;

when attacked by the army $B$: $\min(15,50,20)=15$;

when attacked by the army $C$: $\min(10,50,20)=10$.

Fifth step: an actual damage value of the current attack is calculated.

Actual damage value=min(actual effective attack power of attacking army, actual attacked quantity of attacked army*current single-soldier health point of attacked army), and current single-soldier health point=current army health point/surviving soldier quantity.

Formula interpretation: the actual effective attack power of the attacking army in the formula is the numerical value calculated in the third step, i.e., a health point which should be reduced by the army; "actual attacked quantity of attacked army*current single-soldier health point of attacked army" is the total health point of the soldiers of the attacked army that can be attacked currently, and therefore, the actual damage value is a minimum value among the two.

After the values are substituted into the formula, the obtained current single-soldier health point of D is 330/50=6.6, and the values of actual damage to D by A, B and C are as follows respectively:

$A$:min(20,20×6.6)=20;

$B$:min(30,15×6.6)=30;

$C$:min(200,10×6.6)=66.

Sixth step: an expected death quantity of the soldiers of the attacked army is calculated.

When the army is damaged and the health point is reduced in war, a case where part of soldiers completely die and the health points of the rest soldiers are not reduced at all is not actual, and in an actual case, the health point of the whole army is reduced when the army begins to be damaged; that is, the health point of each soldier is reduced at this point, and when the health point of the army reaches a certain threshold, part of soldiers begin to die, and the health points of the rest soldiers are not full at that time, and therefore, corresponding death schemes (i.e., a table of corresponding relationships between residual health point percentages and surviving soldier percentages) are made for different soldiers, and a death scheme corresponding to an infantry army is shown in the following table 2.

TABLE 2

| Residual health point percentage | Surviving soldier percentage |
| --- | --- |
| 100% | 100.00% |
| 95.00% | 100.00% |
| 90.00% | 100.00% |
| 85.00% | 100.00% |
| 80.00% | 100.00% |
| 75.00% | 100.00% |
| 70.00% | 100.00% |
| 64.86% | 94.00% |
| 60.72% | 88.00% |
| 55.76% | 82.00% |
| 51.68% | 76.00% |
| 45.56% | 68.00% |
| 40.20% | 60.00% |
| 33.00% | 50.00% |
| 30.36% | 46.00% |
| 27.30% | 42.00% |
| 23.40% | 36.00% |
| 21.76% | 34.00% |
| 19.20% | 30.00% |
| 15.12% | 24.00% |
| 12.40% | 20.00% |
| 8.40% | 14.00% |
| 4.64% | 8.00% |

As shown in table 2, when the residual health point percentage of the army is 70% or more, no soldier of the army dies; when the residual health point percentage of the army reaches 64.86%, 94% of the soldiers in the army survive, and 6% of the soldiers die; when the residual health point percentage of the army is 4.64% or less, 8% of the soldiers of the army survive; that is, the last 8% of the soldiers die at the same time. The data in table 2 is obtained by adjusting different soldier species according to actual conditions.

For the attacked army D, the current army health point thereof may be calculated according to the surviving soldier percentage thereof, and specifically, knowing that 50% of the soldiers survive (i.e., the surviving soldier percentage is 50%), it may be found from table 2 that the left army health point should be 33% (i.e., the residual health point percentage is 33%) at this point, and then, the current army health point is 1000*33%=330.

According to the actual damage value (i.e., the health point of the army D which should be deducted) in the fifth step, the residual army health point of the army D is obtained as follows:

$A$:330-20=310;

$B$:330-30=300;

$C$:330-132=198.

Then, the residual health point percentages are calculated respectively, and the surviving soldier percentages are further found from the table, such that the expected death quantities are calculated specifically as follows:

A: 310/1000=31%, the corresponding surviving soldier percentage is 50%; that is, an expected surviving soldier quantity is 50, the expected death quantity is 0, and the health points of the currently surviving soldiers continue to be reduced;

B: 300/1000=30%, the corresponding surviving soldier percentage is 46%; that is, an expected surviving soldier quantity is 46, and the expected death quantity is 4;

C: 198/1000=19.8%, the corresponding surviving soldier percentage is 34%; that is, an expected surviving soldier quantity is 34, and the expected death quantity is 16.

Seventh step: issuing the expected death quantity to the client.

Eighth step: playing, by the client, a death action according to the expected death quantity.

Thus, death expression of the army in the war may quite conform to the cognition of the player and the actual war scenario.

The information processing method according to the embodiment of the present disclosure has the following beneficial effects.

1. The two pieces of data of the surviving soldier quantity and the maximum army damage quantity of the attacking army are acquired, which essentially means that the soldier species and the attack expression of the soldiers in a real battlefield are taken into consideration, such that real-time damage caused by the attacking army in the actual war is reflected more truly, and compared with existing simple linear or quadratic attenuation of the attack, a relationship between the change of the real-time damage caused by the army and the change of death of the soldiers of the army in the actual combat may better conform to the cognition of the player.

2. The scenario that a large number of soldiers in one army cannot be attacked at the same time in real combat is restored by acquiring the surviving soldier quantity of the attacked army and the maximum army damage quantity thereof.

3. The server calculates the value of actual damage taken by the attacked army and the expected death quantity thereof in real time, the expected death quantity also takes the soldier species into consideration, and the army has different expected quantities of death of the soldiers under different health points, such that the quantity of the soldiers seen by the player in the combat when the death action is played is in line with expectation.

In summary, in the embodiment of the present disclosure, the characteristics of the soldier species are mainly added into the combat model, such that the actual effective attack power of the attacking army, the actual damage value taken by the attacked army and the expected death quantity caused by the attack are more consistent with the expression in the real war, and the player may have more real combat experiences.

Figure 3:
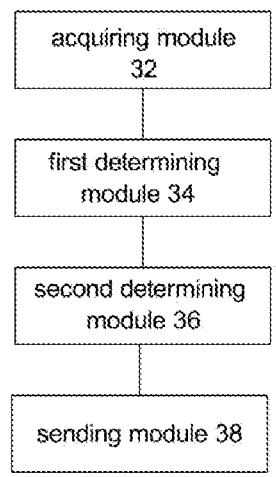
FIG. 3 is a structural block diagram of an information processing apparatus according to an embodiment of the present disclosure.

Corresponding to the above-mentioned information processing method, an embodiment of the present disclosure further provides an information processing apparatus. Reference is made to FIG. 3 which shows a block diagram of an information processing apparatus including:

an acquiring module 32, configured to acquire current combat information of an attacking army and current combat information of an attacked army of a current attack, wherein the current combat information of the attacking army includes a soldier species, a surviving soldier quantity and army attack power of the attacking army, and the current combat information of the attacked army includes a soldier species, a surviving soldier quantity and a current army health point of the attacked army;

a first determining module 34, configured to determine an actual damage value of the current attack according to the current combat information of the attacking army and the current combat information of the attacked army;

a second determining module 36, configured to determine an expected death quantity of soldiers of the attacked army according to the actual damage value and the soldier species and the current army health point of the attacked army; and a sending module 38, configured to send the expected death quantity to a client, such that the client plays a death action corresponding to the expected death quantity.

In the information processing apparatus according to the embodiment of the present disclosure, influences of the soldier species and the surviving soldier quantity are considered when the actual damage value is determined, and influences of the soldier species are also considered when the expected death quantity is determined based on the actual damage value, such that the obtained expected death quantity is more consistent with expression in real war, and a combat process is more real and consistent with cognition, thereby optimizing a combat scene on a client and improving combat experiences of a player.

Optionally, the above first determining module 34 is further configured to:

determine actual effective attack power of the attacking army according to the soldier species, the surviving soldier quantity and the army attack power of the attacking army;

determine a maximum army damage quantity of the attacking army according to the soldier species and the surviving soldier quantity of the attacking army, and determine a maximum army damage quantity of the attacked army according to the soldier species and the surviving soldier quantity of the attacked army;

determine an actual attacked quantity of the attacked army according to the maximum army damage quantity of the attacking army, and the surviving soldier quantity and the maximum army damage quantity of the attacked army; and determine the actual damage value of the current attack according to the actual effective attack power of the attacking army, as well as the actual attacked quantity, the surviving soldier quantity and the current army health point of the attacked army.

Optionally, the above first determining module 34 is further configured to:

when an attack type corresponding to the soldier species of the attacking army is a melee attack, acquire a maximum effective attack quantity corresponding to the soldier species of the attacking army, and calculate the actual effective attack power of the attacking army using the following formula:

$$A_1 = A_0 * \min(N_{11}, Q_{11}) / N_{10}; \text{ and}$$

when the attack type corresponding to the soldier species of the attacking army is a ranged attack, calculate the actual effective attack power of the attacking army using the following formula:

$$A_1 = A_0 * N_{11} / N_{10},$$

wherein $A_1$ represents the actual effective attack power of the attacking army, $A_0$ represents the army attack power of the attacking army, $N_{11}$ represents the surviving soldier quantity of the attacking army, $Q_{11}$ represents the maximum effective attack quantity of the attacking army, and $N_{10}$ represents a full-strength soldier quantity of the attacking army, wherein the full-strength soldier quantity means the maximum quantity of soldiers that can be accommodated in the army.

Optionally, the first determining module 34 is further configured to:

when the attack type corresponding to the soldier species of the attacking army is a melee attack, acquire the maximum effective attack quantity corresponding to the soldier species of the attacking army, and calculate the maximum army damage quantity of the attacking army using the following formula:

$$Q_{12} = Q_{10} * \min(N_{11}, Q_{11}); \text{ and}$$

when the attack type corresponding to the soldier species of the attacking army is a ranged attack, calculate the maximum army damage quantity of the attacking army using the following formula:

$$Q_{12} = Q_{10} * N_{11},$$

wherein $Q_{12}$ represents the maximum army damage quantity of the attacking army, $Q_{10}$ represents the maximum single-soldier damage quantity corresponding to the soldier species of the attacking army, $N_{11}$ represents the surviving soldier quantity of the attacking army, and $Q_{11}$ represents the maximum effective attack quantity of the attacking army.

Optionally, the above first determining module 34 is further configured to:

when an attack type corresponding to the soldier species of the attacked army is a melee attack, acquire a maximum effective attack quantity corresponding to the soldier species of the attacked army, and calculate the maximum army damage quantity of the attacked army using the following formula:

$$Q_{22} = Q_{20} * \min(N_{21}, Q_{21}), \text{ and}$$

when the attack type corresponding to the soldier species of the attacked army is a ranged attack, calculate the maximum army damage quantity of the attacked army using the following formula:

$$Q_{22} = Q_{20} * N_{21},$$

wherein $Q_{22}$ represents the maximum army damage quantity of the attacked army, $Q_{20}$ represents a maximum single-soldier damage quantity corresponding to the soldier species of the attacked army, $N_{21}$ represents the surviving soldier quantity of the attacked army, and $Q_{21}$ represents the maximum effective attack quantity of the attacked army.

Optionally, the above first determining module 34 is further configured to:

determine a minimum value of the maximum army damage quantity of the attacking army, and the surviving soldier quantity and the maximum army damage quantity of the attacked army as the actual attacked quantity of the attacked army.

Optionally, the above first determining module 34 is further configured to:

determine the actual damage value of the current attack using the following formula:

$$H=\min(A_1, N_3 * B_1/N_{21}),$$

wherein H represents the actual damage value of the current attack, $A_1$ represents the actual effective attack power of the attacking army, $N_3$ represents the actual attacked quantity of the attacked army, $B_1$ represents the current army health point of the attacked army, and $N_{21}$ represents the surviving soldier quantity of the attacked army.

Optionally, the above second determining module 36 is further configured to:

determine the residual army health point of the attacked army according to the actual damage value and the current army health point of the attacked army;

determine the expected death quantity of the soldiers of the attacked army according to the residual army health point of the attacked army, the soldier species of the attacked army and the preset corresponding relationship between the health point and the surviving soldiers corresponding to the soldier species.

Optionally, the above second determining module 36 is further configured to:

determine a damage reduction ratio of the attacked army according to the current defense power of the attacked army; and determine the residual army health point of the attacked army using the following formula:

$$B_2 = B_1 - H*(1-r),$$

wherein $B_2$ represents the residual army health point of the attacked army, $B_1$ represents the current army health point of the attacked army, H represents the actual damage value, r represents the damage reduction ratio of the attacked army, and $H*(1-r)$ represents the army health point deducting quantity of the attacked army.

Optionally, the above corresponding relationship between the health point and the surviving soldiers includes a table of corresponding relationships between residual health point percentages and surviving soldier percentages, and the above second determining module 36 is further configured to:

calculate a residual health point percentage of the attacked army according to the residual army health point and a full-strength army health point of the attacked army;

acquire a target corresponding relationship table, wherein the target corresponding relationship table is a table of corresponding relationships between a residual health point percentage and a surviving soldier percentage corresponding to the soldier species of the attacked army;

search the target corresponding relationship table to obtain a target surviving soldier percentage corresponding to the residual health point percentage of the attacked army; and determine the expected death quantity of the soldiers of the attacked army according to the target surviving soldier percentage.

The apparatus according to the present embodiment has the same implementation principle and technical effects as the method embodiment, and for simple descriptions, for unmentioned details of the embodiment of the apparatus, reference may be made to the corresponding content in the method embodiment.

Figure 4:
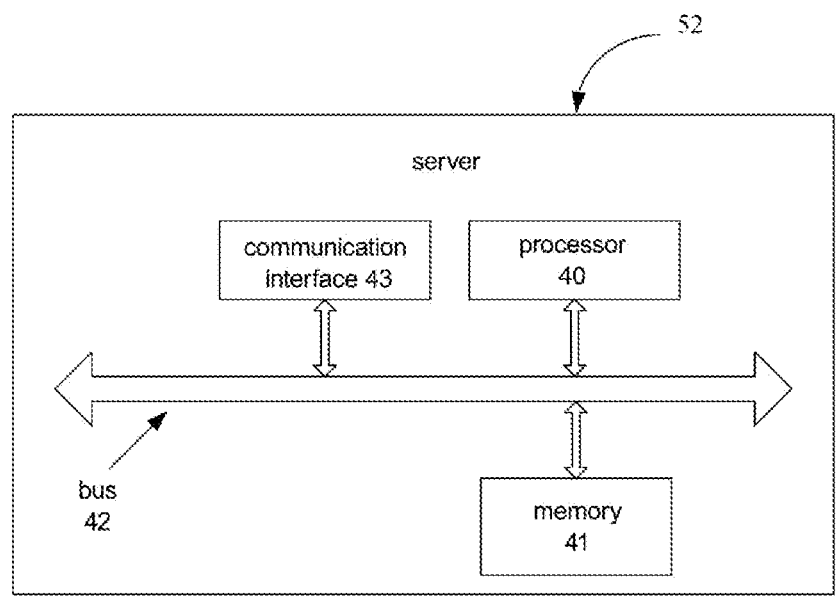
FIG. 4 is a schematic structural diagram of a server according to an embodiment of the present disclosure.

An embodiment of the present disclosure further provides a server, and referring to FIG. 4 which shows a schematic structural diagram of a server, the server 52 includes: a processor 40, a memory 41, a bus 42 and a communication interface 43, wherein the processor 40, the communication interface 43 and the memory 41 are connected through the bus 42; the processor 40 is configured to execute an executable module, such as a computer program, stored in the memory 41.

In the above, the memory 41 may include a random access memory (RAM) or a non-volatile memory (NVM), such as at least one disk memory. Communication connection between a system network element and at least one other network element is implemented through the at least one communication interface 43 (which may be wired or wireless), and the Internet, Wide Area Network, Local Area Network, Metropolitan Area Network, or the like, may be used.

The bus 42 may be an Industry Standard Architecture (ISA) bus, a Peripheral Component Interconnect (PCI) bus, an Extended Industry Standard Architecture (EISA) bus, or the like. The bus may be an address bus, a data bus, a control bus, or the like. For ease of representation, the bus is represented by only one double-headed arrow in FIG. 4, but this does not mean that there is only one bus or one type of buses.

In the above, the memory 41 is configured to store a program, and the processor 40 executes the program after receiving an execution instruction, and the method performed by the apparatus defined by the procedure disclosed in any of the foregoing embodiments of the present disclosure may be applied in the processor 40 or implemented by the processor 40.

The processor 40 may be an integrated circuit chip having a signal processing capability. In an implementation process, the information processing method may be completed by integrated logic circuits of hardware or instructions in the form of software in the processor 40.

The information processing method may include: current combat information of an attacking army and current combat information of an attacked army of a current attack are acquired, wherein the current combat information of the attacking army includes a soldier species, a surviving soldier quantity and army attack power of the attacking army, and the current combat information of the attacked army includes a soldier species, a surviving soldier quantity and a current army health point of the attacked army; an actual damage value of the current attack is determined according to the current combat information of the attacking army and the current combat information of the attacked army; an expected death quantity of soldiers of the attacked army is determined according to the actual damage value and the soldier species and the current army health point of the attacked army; and the expected death quantity is sent to a client, such that the client plays a death action corresponding to the expected death quantity.

The step of an actual damage value of the current attack is determined according to the current combat information of the attacking army and the current combat information of the attacked army may include: actual effective attack power of the attacking army is determined according to the soldier species, the surviving soldier quantity and the army attack power of the attacking army; a maximum army damage quantity of the attacking army is determined according to the soldier species and the surviving soldier quantity of the attacking army, and a maximum army damage quantity of the attacked army is determined according to the soldier species and the surviving soldier quantity of the attacked army; an actual attacked quantity of the attacked army is determined according to the maximum army damage quantity of the attacking army, and the surviving soldier quantity and the maximum army damage quantity of the attacked army; and the actual damage value of the current attack is determined according to the actual effective attack power of the attacking army, as well as the actual attacked quantity, the surviving soldier quantity and the current army health point of the attacked army.

The step of actual effective attack power of the attacking army is determined according to the soldier species, the surviving soldier quantity and the army attack power of the attacking army may include:

when an attack type corresponding to the soldier species of the attacking army is a melee attack, a maximum effective attack quantity corresponding to the soldier species of the attacking army is acquired, and the actual effective attack power of the attacking army is calculated using the following formula: $A_1 = A_0 * \min(N_{11},$ and when the attack type corresponding to the soldier species of the attacking army is a ranged attack, the actual effective attack power of the attacking army is calculated using the following formula: $A_1 = A_0 * N_{11} / N_{10}$, wherein $A_1$ represents the actual effective attack power of the attacking army, $A_0$ represents the army attack power of the attacking army, $N_{11}$ represents the surviving soldier quantity of the attacking army, $Q_{11}$ represents the maximum effective attack quantity of the attacking army, and $N_{10}$ represents a full-strength soldier quantity of the attacking army.

The step of a maximum army damage quantity of the attacking army is determined according to the soldier species and the surviving soldier quantity of the attacking army may include:

when the attack type corresponding to the soldier species of the attacking army is a melee attack, the maximum effective attack quantity corresponding to the soldier species of the attacking army is acquired, and the maximum army damage quantity of the attacking army is calculated using the following formula:

$$Q_{12} = Q_{10} * \min(N_{11}, Q_{11}); \text{ and}$$

when the attack type corresponding to the soldier species of the attacking army is a ranged attack, the maximum army damage quantity of the attacking army is calculated using the following formula:

$$Q_{12} = Q_{10} * N_{11},$$

wherein $Q_{12}$ represents the maximum army damage quantity of the attacking army, $Q_{10}$ represents a maximum single-soldier damage quantity corresponding to the soldier species of the attacking army, $N_{11}$ represents the surviving soldier quantity of the attacking army, and $Q_{11}$ represents the maximum effective attack quantity of the attacking army.

The step of a maximum army damage quantity of the attacked army is determined according to the soldier species and the surviving soldier quantity of the attacked army may include:

when an attack type corresponding to the soldier species of the attacked army is a melee attack, a maximum effective attack quantity corresponding to the soldier species of the attacked army is acquired, and the maximum army damage quantity of the attacked army is calculated using the following formula:

$$Q_{22} = Q_{20} * \min(N_{21}, Q_{21}); \text{ and}$$

when the attack type corresponding to the soldier species of the attacked army is a ranged attack, the maximum army damage quantity of the attacked army is calculated using the following formula:

$$Q_{22} = Q_{20} * N_{21},$$

wherein $Q_{22}$ represents the maximum army damage quantity of the attacked army, $Q_{20}$ represents a maximum single-soldier damage quantity corresponding to the soldier species of the attacked army, $N_{21}$ represents the surviving soldier quantity of the attacked army, and $Q_{21}$ represents the maximum effective attack quantity of the attacked army.

The step of an actual attacked quantity of the attacked army is determined according to the maximum army damage quantity of the attacking army, and the surviving soldier quantity and the maximum army damage quantity of the attacked army may include:

a minimum value of the maximum army damage quantity of the attacking army, and the surviving soldier quantity and the maximum army damage quantity of the attacked army are determined as the actual attacked quantity of the attacked army.

The step of the actual damage value of the current attack is determined according to the actual effective attack power of the attacking army, as well as the actual attacked quantity, the surviving soldier quantity and the current army health point of the attacked army may include:

the actual damage value of the current attack is determined using the following formula:

$$H = \min(A_1, N_3 * B_1 / N_{21}),$$

wherein H represents the actual damage value of the current attack, $A_1$ represents the actual effective attack power of the attacking army, $N_3$ represents the actual attacked quantity of the attacked army, $B_1$ represents the current army health point of the attacked army, and $N_{21}$ represents the surviving soldier quantity of the attacked army.

The step of an expected death quantity of soldiers of the attacked army is determined according to the actual damage value and the soldier species and the current army health point of the attacked army may include:

a residual army health point of the attacked army is determined according to the actual damage value and the current army health point of the attacked army; and the expected death quantity of the soldiers of the attacked army is determined according to the residual army health point of the attacked army, the soldier species of the attacked army and a preset corresponding relationship between a health point and surviving soldiers corresponding to the soldier species.

The current combat information of the attacked army further includes current defense power of the attacked army; the step of a residual army health point of the attacked army is determined according to the actual damage value and the current army health point of the attacked army may include:
- a damage reduction ratio of the attacked army is determined according to the current defense power of the attacked army; and
- the residual army health point of the attacked army is determined using the following formula:

$$B_2 = B_1 - H*(1-r),$$

wherein $B_2$ represents the residual army health point of the attacked army, $B_1$ represents the current army health point of the attacked army, H represents the actual damage value, and r represents the damage reduction ratio of the attacked army.

The corresponding relationship between the health point and the surviving soldiers includes a table of corresponding relationships between residual health point percentages and surviving soldier percentages; the step of the expected death quantity of the soldiers of the attacked army is determined according to the residual army health point of the attacked army, the soldier species of the attacked army and a preset corresponding relationship between a health point and surviving soldiers corresponding to the soldier species may include:
- a residual health point percentage of the attacked army is calculated according to the residual army health point and a full-strength army health point of the attacked army;
- a target corresponding relationship table is acquired, wherein the target corresponding relationship table is a table of corresponding relationships between a residual health point percentage and a surviving soldier percentage corresponding to the soldier species of the attacked army;
- the target corresponding relationship table is searched to obtain a target surviving soldier percentage corresponding to the residual health point percentage of the attacked army; and
- the expected death quantity of the soldiers of the attacked army is determined according to the target surviving soldier percentage.

The above processor 40 may be a general-purpose processor, including a Central Processing Unit (CPU), a Network Processor (NP), or the like; or a Digital Signal Processor (DSP), an Application Specific Integrated Circuit (ASIC), a Field-Programmable Gate Array (FPGA) or other programmable logic devices, discrete gate or transistor logic devices, or discrete hardware components. Various methods, steps, and logic blocks in the embodiments of the present disclosure may be implemented or executed. The general-purpose processor may be a microprocessor, any conventional processor, or the like. The steps of the method according to the embodiments of the present disclosure may be directly implemented by a hardware decoding processor, or implemented by a combination of hardware and software modules in a decoding processor. The software module may be located in a storage medium well known in the art, such as a random access memory, a flash memory, a read-only memory, a programmable read-only memory, an electrically erasable programmable memory, a register, or the like. The storage medium is located in the memory 41, and the processor 40 reads information in the memory 41, and completes the steps of the information processing method in combination with hardware thereof.

Thus, influences of the soldier species and the surviving soldier quantity are considered when the actual damage value is determined, and influences of the soldier species are also considered when the expected death quantity is determined based on the actual damage value, such that the obtained expected death quantity is more consistent with expression in real war, and a combat process is more real and consistent with cognition, thereby optimizing a combat scene on a client and improving combat experiences of a player.

Figure 5:
FIG. 5 is a structural block diagram of an information processing system according to an embodiment of the present disclosure.

An embodiment of the present disclosure further provides an information processing system, and referring to FIG. 5 which shows a block diagram of an information processing system, the information processing system may include the above-mentioned server 52, and may further include a client 54 connected with the server 52.

The server 52 acquires current combat information of both armies in real time during each attack, and calculates an expected death quantity of an attacked army in real time, so as to send the expected death quantity to the client 54; when receiving the expected death quantity of the attacked army, the client 54 plays a corresponding death action.

The server 52 includes a processor 40 and a memory 41, the memory 41 stores a computer program capable of running on the processor 40, and the processor 40, when executing the computer program, implements an information processing method, which may include: current combat information of an attacking army and current combat information of an attacked army of a current attack are acquired, wherein the current combat information of the attacking army includes a soldier species, a surviving soldier quantity and army attack power of the attacking army, and the current combat information of the attacked army includes a soldier species, a surviving soldier quantity and a current army health point of the attacked army; an actual damage value of the current attack is determined according to the current combat information of the attacking army and the current combat information of the attacked army; an expected death quantity of soldiers of the attacked army is determined according to the actual damage value and the soldier species and the current army health point of the attacked army; and the expected death quantity is sent to a client, such that the client plays a death action corresponding to the expected death quantity.

The step of an actual damage value of the current attack is determined according to the current combat information of the attacking army and the current combat information of the attacked army may include: actual effective attack power of the attacking army is determined according to the soldier species, the surviving soldier quantity and the army attack power of the attacking army; a maximum army damage quantity of the attacking army is determined according to the soldier species and the surviving soldier quantity of the attacking army, and a maximum army damage quantity of the attacked army is determined according to the soldier species and the surviving soldier quantity of the attacked army; an actual attacked quantity of the attacked army is determined according to the maximum army damage quantity of the attacking army, and the surviving soldier quantity and the maximum army damage quantity of the attacked army; and the actual damage value of the current attack is determined according to the actual effective attack power of the attacking army, as well as the actual attacked quantity, the surviving soldier quantity and the current army health point of the attacked army.

The step of actual effective attack power of the attacking army is determined according to the soldier species, the surviving soldier quantity and the army attack power of the attacking army may include:

when an attack type corresponding to the soldier species of the attacking army is a melee attack, a maximum effective attack quantity corresponding to the soldier species of the attacking army is acquired, and the actual effective attack power of the attacking army is calculated using the following formula: $A_1 = A_0 * \min(N_{11}, Q_{11})$; and when the attack type corresponding to the soldier species of the attacking army is a ranged attack, the actual effective attack power of the attacking army is calculated using the following formula: $A_1 = A_0 * N_{11} / N_{10}$, wherein $A_1$ represents the actual effective attack power of the attacking army, $A_0$ represents the army attack power of the attacking army, $N_{11}$ represents the surviving soldier quantity of the attacking army, $Q_{11}$ represents the maximum effective attack quantity of the attacking army, and $N_{10}$ represents a full-strength soldier quantity of the attacking army.

The step of a maximum army damage quantity of the attacking army is determined according to the soldier species and the surviving soldier quantity of the attacking army may include:

when the attack type corresponding to the soldier species of the attacking army is a melee attack, the maximum effective attack quantity corresponding to the soldier species of the attacking army is acquired, and the maximum army damage quantity of the attacking army is calculated using the following formula:

$$Q_{12} = Q_{10} * \min(N_{11}, Q_{11}); \text{ and}$$

when the attack type corresponding to the soldier species of the attacking army is a ranged attack, the maximum army damage quantity of the attacking army is calculated using the following formula:

$$Q_{12} = Q_{10} * N_{11},$$

wherein $Q_{12}$ represents the maximum army damage quantity of the attacking army, $Q_{10}$ represents a maximum single-soldier damage quantity corresponding to the soldier species of the attacking army, $N_{11}$ represents the surviving soldier quantity of the attacking army, and $Q_{11}$ represents the maximum effective attack quantity of the attacking army.

The step of a maximum army damage quantity of the attacked army is determined according to the soldier species and the surviving soldier quantity of the attacked army may include:

when an attack type corresponding to the soldier species of the attacked army is a melee attack, a maximum effective attack quantity corresponding to the soldier species of the attacked army is acquired, and the maximum army damage quantity of the attacked army is calculated using the following formula:

$$Q_{22} = Q_{20} * \min(N_{21}, Q_{21});$$

when the attack type corresponding to the soldier species of the attacked army is a ranged attack, the maximum army damage quantity of the attacked army is calculated using the following formula:

$$Q_{22} = Q_{20} * N_{21},$$

wherein $Q_{22}$ represents the maximum army damage quantity of the attacked army, $Q_{20}$ represents a maximum single-soldier damage quantity corresponding to the soldier species of the attacked army, $N_{21}$ represents the surviving soldier quantity of the attacked army, and $Q_{21}$ represents the maximum effective attack quantity of the attacked army.

The step of an actual attacked quantity of the attacked army is determined according to the maximum army damage quantity of the attacking army, and the surviving soldier quantity and the maximum army damage quantity of the attacked army may include:

a minimum value of the maximum army damage quantity of the attacking army, and the surviving soldier quantity and the maximum army damage quantity of the attacked army are determined as the actual attacked quantity of the attacked army.

The step of the actual damage value of the current attack is determined according to the actual effective attack power of the attacking army, as well as the actual attacked quantity, the surviving soldier quantity and the current army health point of the attacked army may include:

the actual damage value of the current attack is determined using the following formula:

$$H = \min(A_1, N_3 * B_1 / N_{21}),$$

wherein H represents the actual damage value of the current attack, $A_1$ represents the actual effective attack power of the attacking army, $N_3$ represents the actual attacked quantity of the attacked army, $B_1$ represents the current army health point of the attacked army, and $N_{21}$ represents the surviving soldier quantity of the attacked army.

The step of an expected death quantity of soldiers of the attacked army is determined according to the actual damage value and the soldier species and the current army health point of the attacked army may include:

a residual army health point of the attacked army is determined according to the actual damage value and the current army health point of the attacked army; and the expected death quantity of the soldiers of the attacked army is determined according to the residual army health point of the attacked army, the soldier species of the attacked army and a preset corresponding relationship between a health point and surviving soldiers corresponding to the soldier species.

The current combat information of the attacked army further includes current defense power of the attacked army; the step of a residual army health point of the attacked army is determined according to the actual damage value and the current army health point of the attacked army may include:

a damage reduction ratio of the attacked army is determined according to the current defense power of the attacked army; and the residual army health point of the attacked army is determined using the following formula:

$$B_2 = B_1 - H * (1 - r),$$

wherein $B_2$ represents the residual army health point of the attacked army, $B_1$ represents the current army health point of the attacked army, H represents the actual damage value, and r represents the damage reduction ratio of the attacked army.

The corresponding relationship between the health point and the surviving soldiers includes a table of corresponding relationships between residual health point percentages and surviving soldier percentages; the step of the expected death quantity of the soldiers of the attacked army is determined according to the residual army health point of the attacked army, the soldier species of the attacked army and a preset corresponding relationship between a health point and surviving soldiers corresponding to the soldier species may include:
- a residual health point percentage of the attacked army is calculated according to the residual army health point and a full-strength army health point of the attacked army;
- a target corresponding relationship table is acquired, wherein the target corresponding relationship table is a table of corresponding relationships between a residual health point percentage and a surviving soldier percentage corresponding to the soldier species of the attacked army;
- the target corresponding relationship table is searched to obtain a target surviving soldier percentage corresponding to the residual health point percentage of the attacked army; and
- the expected death quantity of the soldiers of the attacked army is determined according to the target surviving soldier percentage.

Thus, influences of the soldier species and the surviving soldier quantity are considered when the actual damage value is determined, and influences of the soldier species are also considered when the expected death quantity is determined based on the actual damage value, such that the obtained expected death quantity is more consistent with expression in real war, and a combat process is more real and consistent with cognition, thereby optimizing a combat scene on a client and improving combat experiences of a player.

In addition, an embodiment of the present disclosure further provides a computer-readable storage medium, which has a computer program stored thereon, wherein the computer program, when executed by a processor, may perform the information processing method according to the foregoing embodiment. The information processing method may include: current combat information of an attacking army and current combat information of an attacked army of a current attack are acquired, wherein the current combat information of the attacking army includes a soldier species, a surviving soldier quantity and army attack power of the attacking army, and the current combat information of the attacked army includes a soldier species, a surviving soldier quantity and a current army health point of the attacked army; an actual damage value of the current attack is determined according to the current combat information of the attacking army and the current combat information of the attacked army; an expected death quantity of soldiers of the attacked army is determined according to the actual damage value and the soldier species and the current army health point of the attacked army; and the expected death quantity is sent to a client, such that the client plays a death action corresponding to the expected death quantity.

The step of an actual damage value of the current attack is determined according to the current combat information of the attacking army and the current combat information of the attacked army may include: actual effective attack power of the attacking army is determined according to the soldier species, the surviving soldier quantity and the army attack power of the attacking army; a maximum army damage quantity of the attacking army is determined according to the soldier species and the surviving soldier quantity of the attacking army, and a maximum army damage quantity of the attacked army is determined according to the soldier species and the surviving soldier quantity of the attacked army; an actual attacked quantity of the attacked army is determined according to the maximum army damage quantity of the attacking army, and the surviving soldier quantity and the maximum army damage quantity of the attacked army; and the actual damage value of the current attack is determined according to the actual effective attack power of the attacking army, as well as the actual attacked quantity, the surviving soldier quantity and the current army health point of the attacked army.

The step of actual effective attack power of the attacking army is determined according to the soldier species, the surviving soldier quantity and the army attack power of the attacking army may include:
- when an attack type corresponding to the soldier species of the attacking army is a melee attack, a maximum effective attack quantity corresponding to the soldier species of the attacking army is acquired, and the actual effective attack power of the attacking army is calculated using the following formula: $A_1 = A_0 * \min(N_{11}, Q_{11})/N_{10}$; and
- when the attack type corresponding to the soldier species of the attacking army is a ranged attack, the actual effective attack power of the attacking army is calculated using the following formula: $A_1 = A_0 * N_{11}/N_{10}$,
- wherein $A_1$ represents the actual effective attack power of the attacking army, $A_0$ represents the army attack power of the attacking army, $N_{11}$ represents the surviving soldier quantity of the attacking army, $Q_{11}$ represents the maximum effective attack quantity of the attacking army, and $N_{10}$ represents a full-strength soldier quantity of the attacking army.

The step of a maximum army damage quantity of the attacking army is determined according to the soldier species and the surviving soldier quantity of the attacking army may include:
- when the attack type corresponding to the soldier species of the attacking army is a melee attack, the maximum effective attack quantity corresponding to the soldier species of the attacking army is acquired, and the maximum army damage quantity of the attacking army is calculated using the following formula: $Q_{12} = Q_{10} * \min(N_{11}, Q_{11})$; and
- when the attack type corresponding to the soldier species of the attacking army is a ranged attack, the maximum army damage quantity of the attacking army is calculated using the following formula:

$$Q_{12} = Q_{10} * N_{11};$$

wherein $Q_{12}$ represents the maximum army damage quantity of the attacking army, $Q_{10}$ represents a maximum single-soldier damage quantity corresponding to the soldier species of the attacking army, $N_{11}$ represents the surviving soldier quantity of the attacking army, and $Q_{11}$ represents the maximum effective attack quantity of the attacking army.

The step of a maximum army damage quantity of the attacked army is determined according to the soldier species and the surviving soldier quantity of the attacked army may include:
- when an attack type corresponding to the soldier species of the attacked army is a melee attack, a maximum effective attack quantity corresponding to the soldier species of the attacked army is acquired, and the maximum army damage quantity of the attacked army is calculated using the following formula:

$$Q_{22} = Q_{20} * \min(N_{21}, Q_{21}); \text{ and}$$

when the attack type corresponding to the soldier species of the attacked army is a ranged attack, the maximum army damage quantity of the attacked army is calculated using the following formula:

$$Q_{22}=Q_{20}*N_{21},$$

wherein $Q_{22}$ represents the maximum army damage quantity of the attacked army, $Q_{20}$ represents a maximum single-soldier damage quantity corresponding to the soldier species of the attacked army, $N_{21}$ represents the surviving soldier quantity of the attacked army, and $Q_{21}$ represents the maximum effective attack quantity of the attacked army.

The step of an actual attacked quantity of the attacked army is determined according to the maximum army damage quantity of the attacking army, and the surviving soldier quantity and the maximum army damage quantity of the attacked army may include:
a minimum value of the maximum army damage quantity of the attacking army, and the surviving soldier quantity and the maximum army damage quantity of the attacked army are determined as the actual attacked quantity of the attacked army.

The step of the actual damage value of the current attack is determined according to the actual effective attack power of the attacking army, as well as the actual attacked quantity, the surviving soldier quantity and the current army health point of the attacked army may include:
the actual damage value of the current attack is determined using the following formula:

$$H=\min(A_1, N_3*B_1/N_{21}),$$

wherein H represents the actual damage value of the current attack, $A_1$ represents the actual effective attack power of the attacking army, $N_3$ represents the actual attacked quantity of the attacked army, $B_1$ represents the current army health point of the attacked army, and $N_{21}$ represents the surviving soldier quantity of the attacked army.

The step of an expected death quantity of soldiers of the attacked army is determined according to the actual damage value and the soldier species and the current army health point of the attacked army may include:
a residual army health point of the attacked army is determined according to the actual damage value and the current army health point of the attacked army; and
the expected death quantity of the soldiers of the attacked army is determined according to the residual army health point of the attacked army, the soldier species of the attacked army and a preset corresponding relationship between a health point species and surviving soldiers corresponding to the soldier.

The current combat information of the attacked army further includes current defense power of the attacked army; the step of a residual army health point of the attacked army is determined according to the actual damage value and the current army health point of the attacked army may include:
a damage reduction ratio of the attacked army is determined according to the current defense power of the attacked army; and
the residual army health point of the attacked army is determined using the following formula:

$$B_2=B_1-H*(1-r),$$

wherein $B_2$ represents the residual army health point of the attacked army, $B_1$ represents the current army health point of the attacked army, H represents the actual damage value, and r represents the damage reduction ratio of the attacked army.

The corresponding relationship between the health point and the surviving soldiers includes a table of corresponding relationships between residual health point percentages and surviving soldier percentages; the step of the expected death quantity of the soldiers of the attacked army is determined according to the residual army health point of the attacked army, the soldier species of the attacked army and a preset corresponding relationship between a health point species and surviving soldiers corresponding to the soldier may include:
a residual health point percentage of the attacked army is calculated according to the residual army health point and a full-strength army health point of the attacked army;
a target corresponding relationship table is acquired, wherein the target corresponding relationship table is a table of corresponding relationships between a residual health point percentage and a surviving soldier percentage corresponding to the soldier species of the attacked army;
the target corresponding relationship table is searched to obtain a target surviving soldier percentage corresponding to the residual health point percentage of the attacked army; and
the expected death quantity of the soldiers of the attacked army is determined according to the target surviving soldier percentage.

The computer-readable storage medium includes: any medium that may store program codes, such as a USB flash disk, a mobile hard disk, a Read-Only Memory (ROM), a RAM, a magnetic disk, or an optical disk.

Thus, influences of the soldier species and the surviving soldier quantity are considered when the actual damage value is determined, and influences of the soldier species are also considered when the expected death quantity is determined based on the actual damage value, such that the obtained expected death quantity is more consistent with expression in real war, and a combat process is more real and consistent with cognition, thereby optimizing a combat scene on a client and improving combat experiences of a player.

The flow chart and the block diagram in the drawings show the architectures, functions and operations that may be implemented by the system, method and computer program product according to the embodiments of the present disclosure. In this regard, each block in the flowchart or block diagrams may represent a module, program segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

In several embodiments provided in the present disclosure, it should be understood that the disclosed system, apparatus, and method may be implemented in other manners. The described apparatus embodiment is only exemplary. For example, the unit division is only logical function division and may be other division in actual implementation. For another example, a plurality of units or components may be combined or integrated into another system, or some features may be ignored or not performed. In addition, the shown or discussed mutual couplings or direct couplings or communication connections may be implemented through some communication interfaces, and the indirect couplings or communication connections between the apparatuses or units may be implemented in electronic, mechanical or other forms.

The units described as separate parts may or may not be physically separate, and parts shown as units may or may not be physical units, that it, they may be located in one position, or may be distributed on a plurality of network units. A part or all of the units may be selected according to an actual need to achieve the objectives of the solutions in the embodiments.

In addition, functional units in the embodiments of the present disclosure may be integrated into one processing unit, or each of the units may exist alone physically, or two or more units are integrated into one unit.

Finally, it should be noted that the above embodiments are only used to illustrate the technical solutions of the present disclosure, but not to limit the present disclosure; although the present disclosure is described in detail with reference to the above embodiments, those having ordinary skill in the art should understand that they still can modify technical solutions recited in the aforesaid embodiments or equivalently replace partial or all technical features therein; these modifications or substitutions do not make essence of corresponding technical solutions depart from the scope of technical solutions of embodiments of the present disclosure.

What is claimed is:

1. An information processing method, comprising steps of:
    acquiring current combat information of an attacking army and current combat information of an attacked army of a current attack, wherein the current combat information of the attacking army comprises a soldier species, a surviving soldier quantity and army attack power of the attacking army, and the current combat information of the attacked army comprises a soldier species, a surviving soldier quantity and a current army health point of the attacked army;
    determining an actual damage value of the current attack according to the current combat information of the attacking army and the current combat information of the attacked army;
    determining an expected death quantity of soldiers of the attacked army according to the actual damage value as well as the soldier species and the current army health point of the attacked army;
    sending the expected death quantity to a client of a war game, such that the client of the war game plays a death action corresponding to the expected death quantity;
    wherein the information processing method is implemented by a server of the war game; and
    wherein the step of determining an actual damage value of the current attack according to the current combat information of the attacking army and the current combat information of the attacked army comprises steps of:
        determining an actual effective attack power of the attacking army according to the soldier species, the surviving soldier quantity and the army attack power of the attacking army;
        determining a maximum army damage quantity of the attacking army according to the soldier species and the surviving soldier quantity of the attacking army, and determining a maximum army damage quantity of the attacked army according to the soldier species and the surviving soldier quantity of the attacked army;
        determining an actual attacked quantity of the attacked army according to the maximum army damage quantity of the attacking army, and the surviving soldier quantity and the maximum army damage quantity of the attacked army; and
        determining the actual damage value of the current attack according to the actual effective attack power of the attacking army, as well as the actual attacked quantity, the surviving soldier quantity and the current army health point of the attacked army.

2. The information processing method according to claim 1, wherein the step of determining an actual effective attack power of the attacking army according to the soldier species, the surviving soldier quantity and the army attack power of the attacking army comprises steps of:
    acquiring, when an attack type corresponding to the soldier species of the attacking army is a melee attack, a maximum effective attack quantity corresponding to the soldier species of the attacking army, and calculating the actual effective attack power of the attacking army using the following formula:

$$A_1 = A_0 * \min(N_{11}, Q_{11})/N_{10}; \text{ and}$$

calculating, when the attack type corresponding to the soldier species of the attacking army is a ranged attack, the actual effective attack power of the attacking army using the following formula:

$$A_1 = A_0 * N_{11}/N_{10},$$

wherein $A_1$ represents the actual effective attack power of the attacking army, $A_0$ represents the army attack power of the attacking army, $N_{11}$ represents the surviving soldier quantity of the attacking army, $Q_{11}$ represents the maximum effective attack quantity of the attacking army, and $N_{10}$ represents a full-strength soldier quantity of the attacking army.

3. The information processing method according to claim 2, wherein the step of determining a maximum army damage quantity of the attacking army according to the soldier species and the surviving soldier quantity of the attacking army comprises steps of:
    acquiring, when the attack type corresponding to the soldier species of the attacking army is a melee attack, the maximum effective attack quantity corresponding to the soldier species of the attacking army, and calculating the maximum army damage quantity of the attacking army using the following formula:

$$Q_{12} = Q_{10} * \min(N_{11}, Q_{11}); \text{ and}$$

calculating, when the attack type corresponding to the soldier species of the attacking army is a ranged attack, the maximum army damage quantity of the attacking army using the following formula:

$$Q_{12} = Q_{10} * N_{11},$$

surviving soldier quantity of the attacking army, and $Q_{11}$ represents the maximum effective attack quantity of the attacking army.

7. The information processing method according to claim 6, wherein the step of determining a maximum army damage quantity of the attacked army according to the soldier species and the surviving soldier quantity of the attacked army comprises steps of:

acquiring, when an attack type corresponding to the soldier species of the attacked army is a melee attack, a maximum effective attack quantity corresponding to the soldier species of the attacked army, and calculating the maximum army damage quantity of the attacked army using the following formula:

$$Q_{22}=Q_{20}*\min(N_{21},Q_{21}),\text{ and}$$

calculating, when the attack type corresponding to the soldier species of the attacked army is a ranged attack, the maximum army damage quantity of the attacked army using the following formula:

$$Q_{22}=Q_{20}*N_{21},$$

wherein $Q_{22}$ represents the maximum army damage quantity of the attacked army, $Q_{20}$ represents a maximum single-soldier damage quantity corresponding to the soldier species of the attacked army, $N_{21}$ represents the surviving soldier quantity of the attacked army, and $Q_{21}$ represents the maximum effective attack quantity of the attacked army.

8. The information processing method according to claim 6, wherein the step of determining an actual attacked quantity of the attacked army according to the maximum army damage quantity of the attacking army, and the surviving soldier quantity and the maximum army damage quantity of the attacked army comprises a step of:

determining a minimum value among the maximum army damage quantity of the attacking army, and the surviving soldier quantity and the maximum army damage quantity of the attacked army as the actual attacked quantity of the attacked army.

9. The information processing method according to claim 1, wherein the step of determining a maximum army damage quantity of the attacked army according to the soldier species and the surviving soldier quantity of the attacked army comprises steps of:

acquiring, when an attack type corresponding to the soldier species of the attacked army is a melee attack, a maximum effective attack quantity corresponding to the soldier species of the attacked army, and calculating the maximum army damage quantity of the attacked army using the following formula:

$$Q_{22}=Q_{20}*\min(N_{21},Q_{21}),\text{ and}$$

calculating, when the attack type corresponding to the soldier species of the attacked army is a ranged attack, the maximum army damage quantity of the attacked army using the following formula:

$$Q_{22}=Q_{20}*N_{21},$$

wherein $Q_{22}$ represents the maximum army damage quantity of the attacked army, $Q_{20}$ represents a maximum single-soldier damage quantity corresponding to the soldier species of the attacked army, $N_{21}$ represents the surviving soldier quantity of the attacked army, and $Q_{21}$ represents the maximum effective attack quantity of the attacked army.

wherein $Q_{12}$ represents the maximum army damage quantity of the attacking army, $Q_{10}$ represents a maximum single-soldier damage quantity corresponding to the soldier species of the attacking army, $N_{11}$ represents the surviving soldier quantity of the attacking army, and $Q_{11}$ represents the maximum effective attack quantity of the attacking army.

4. The information processing method according to claim 2, wherein the step of determining a maximum army damage quantity of the attacked army according to the soldier species and the surviving soldier quantity of the attacked army comprises steps of:

acquiring, when an attack type corresponding to the soldier species of the attacked army is a melee attack, a maximum effective attack quantity corresponding to the soldier species of the attacked army, and calculating the maximum army damage quantity of the attacked army using the following formula:

$$Q_{22}=Q_{20}*\min(N_{21},Q_{21}),\text{ and}$$

calculating, when the attack type corresponding to the soldier species of the attacked army is a ranged attack, the maximum army damage quantity of the attacked army using the following formula:

$$Q_{22}=Q_{20}*N_{21},$$

wherein $Q_{22}$ represents the maximum army damage quantity of the attacked army, $Q_{20}$ represents a maximum single-soldier damage quantity corresponding to the soldier species of the attacked army, $N_{21}$ represents the surviving soldier quantity of the attacked army, and $Q_{21}$ represents the maximum effective attack quantity of the attacked army.

5. The information processing method according to claim 2, wherein the step of determining an actual attacked quantity of the attacked army according to the maximum army damage quantity of the attacking army, and the surviving soldier quantity and the maximum army damage quantity of the attacked army comprises a step of:

determining a minimum value among the maximum army damage quantity of the attacking army, and the surviving soldier quantity and the maximum army damage quantity of the attacked army as the actual attacked quantity of the attacked army.

6. The information processing method according to claim 1, wherein the step of determining a maximum army damage quantity of the attacking army according to the soldier species and the surviving soldier quantity of the attacking army comprises steps of:

acquiring, when the attack type corresponding to the soldier species of the attacking army is a melee attack, the maximum effective attack quantity corresponding to the soldier species of the attacking army, and calculating the maximum army damage quantity of the attacking army using the following formula:

$$Q_{12}=Q_{10}*\min(N_{11},Q_{11});\text{ and}$$

calculating, when the attack type corresponding to the soldier species of the attacking army is a ranged attack, the maximum army damage quantity of the attacking army using the following formula:

$$Q_{12}=Q_{10}*N_{11},$$

wherein $Q_{12}$ represents the maximum army damage quantity of the attacking army, $Q_{10}$ represents a maximum single-soldier damage quantity corresponding to the soldier species of the attacking army, $N_{11}$ represents the 10. The information processing method according to claim 9, wherein the step of determining an actual attacked quantity of the attacked army according to the maximum army damage quantity of the attacking army, and the surviving soldier quantity and the maximum army damage quantity of the attacked army comprises a step of:
  determining a minimum value among the maximum army damage quantity of the attacking army, and the surviving soldier quantity and the maximum army damage quantity of the attacked army as the actual attacked quantity of the attacked army.

11. The information processing method according to claim 1, wherein the step of determining an actual attacked quantity of the attacked army according to the maximum army damage quantity of the attacking army, and the surviving soldier quantity and the maximum army damage quantity of the attacked army comprises a step of:
  determining a minimum value among the maximum army damage quantity of the attacking army, and the surviving soldier quantity and the maximum army damage quantity of the attacked army as the actual attacked quantity of the attacked army.

12. The information processing method according to claim 1, wherein the step of determining the actual damage value of the current attack according to the actual effective attack power of the attacking army, as well as the actual attacked quantity, the surviving soldier quantity and the current army health point of the attacked army comprises a step of:
  determining the actual damage value of the current attack using the following formula:

$$H = \min(A_1, N_3 * B_1/N_{21}),$$

wherein H represents the actual damage value of the current attack, $A_1$ represents the actual effective attack power of the attacking army, $N_3$ represents the actual attacked quantity of the attacked army, $B_1$ represents the current army health point of the attacked army, and $N_{21}$ represents the surviving soldier quantity of the attacked army.

13. The information processing method according to claim 1, wherein the step of determining an expected death quantity of soldiers of the attacked army according to the actual damage value as well as the soldier species and the current army health point of the attacked army comprises steps of:
  determining a residual army health point of the attacked army according to the actual damage value and the current army health point of the attacked army; and
  determining the expected death quantity of the soldiers of the attacked army according to the residual army health point of the attacked army, the soldier species of the attacked army, and the preset corresponding relationship between the health point and the surviving soldiers corresponding to the soldier species.

14. The information processing method according to claim 13, wherein the current combat information of the attacked army further comprises a current defense power of the attacked army; and the step of determining a residual army health point of the attacked army according to the actual damage value and the current army health point of the attacked army comprises steps of:
  determining a damage reduction ratio of the attacked army according to the current defense power of the attacked army; and determining the residual army health point of the attacked army using the following formula:

$$B_2 = B_1 - H*(1-r),$$

wherein $B_2$ represents the residual army health point of the attacked army, $B_1$ represents the current army health point of the attacked army, H represents the actual damage value, and r represents the damage reduction ratio of the attacked army.

15. The information processing method according to claim 13, wherein the corresponding relationship between the health point and the surviving soldiers comprises a table of corresponding relationships between residual health point percentages and surviving soldier percentages; and the step of determining the expected death quantity of the soldiers of the attacked army according to the residual army health point of the attacked army, the soldier species of the attacked army, and a preset corresponding relationship between a health point and surviving soldiers corresponding to the soldier species comprises steps of:
  calculating the residual health point percentage of the attacked army according to the residual army health point and a full-strength army health point of the attacked army;
  acquiring a target corresponding relationship table, wherein the target corresponding relationship table is a table of corresponding relationships between the residual health point percentages and the surviving soldier percentages corresponding to the soldier species of the attacked army;
  searching the target corresponding relationship table to obtain a target surviving soldier percentage corresponding to the residual health point percentage of the attacked army; and
  determining the expected death quantity of the soldiers of the attacked army according to the target surviving soldier percentage.

16. A server, comprising a memory and a processor, wherein the memory stores a computer program operable on the processor, and the processor implements, when executing the computer program, the computer program being configured to perform the following steps:
  acquiring current combat information of an attacking army and current combat information of an attacked army of a current attack, wherein the current combat information of the attacking army comprises a soldier species, a surviving soldier quantity and army attack power of the attacking army, and the current combat information of the attacked army comprises a soldier species, a surviving soldier quantity and a current army health point of the attacked army;
  determining an actual damage value of the current attack according to the current combat information of the attacking army and the current combat information of the attacked army;
  determining an expected death quantity of soldiers of the attacked army according to the actual damage value as well as the soldier species and the current army health point of the attacked army; and
  sending the expected death quantity to a client of the war game, such that the client of the war game plays a death action corresponding to the expected death quantity; and
  wherein the step of determining an actual damage value of the current attack according to the current combat information of the attacking army and the current combat information of the attacked army comprises steps of:

determining an actual effective attack power of the attacking army according to the soldier species, the surviving soldier quantity and the army attack power of the attacking army;

determining a maximum army damage quantity of the attacking army according to the soldier species and the surviving soldier quantity of the attacking army, and determining a maximum army damage quantity of the attacked army according to the soldier species and the surviving soldier quantity of the attacked army;

determining an actual attacked quantity of the attacked army according to the maximum army damage quantity of the attacking army, and the surviving soldier quantity and the maximum army damage quantity of the attacked army; and determining the actual damage value of the current attack according to the actual effective attack power of the attacking army, as well as the actual attacked quantity, the surviving soldier quantity and the current army health point of the attacked army.

17. A computer-readable storage medium having a computer program stored thereon, wherein the computer program performs, when executed by a processor, the following steps:

acquiring current combat information of an attacking army and current combat information of an attacked army of a current attack, wherein the current combat information of the attacking army comprises a soldier species, a surviving soldier quantity and army attack power of the attacking army, and the current combat information of the attacked army comprises a soldier species, a surviving soldier quantity and a current army health point of the attacked army;

determining an actual damage value of the current attack according to the current combat information of the attacking army and the current combat information of the attacked army;

determining an expected death quantity of soldiers of the attacked army according to the actual damage value as well as the soldier species and the current army health point of the attacked army;

sending the expected death quantity to a client of the war game, such that the client of the war game plays a death action corresponding to the expected death quantity; and wherein the step of determining an actual damage value of the current attack according to the current combat information of the attacking army and the current combat information of the attacked army comprises steps of:

determining an actual effective attack power of the attacking army according to the soldier species, the surviving soldier quantity and the army attack power of the attacking army;

determining a maximum army damage quantity of the attacking army according to the soldier species and the surviving soldier quantity of the attacking army, and determining a maximum army damage quantity of the attacked army according to the soldier species and the surviving soldier quantity of the attacked army;

determining an actual attacked quantity of the attacked army according to the maximum army damage quantity of the attacking army, and the surviving soldier quantity and the maximum army damage quantity of the attacked army; and determining the actual damage value of the current attack according to the actual effective attack power of the attacking army, as well as the actual attacked quantity, the surviving soldier quantity and the current army health point of the attacked army.

* * * * *